United States Patent [19]

Hughes et al.

[11] 3,887,441
[45] June 3, 1975

[54] ELECTRO-CHEMICAL SYNTHESIS OF ORGANONICKEL COMPOUNDS

[75] Inventors: William B. Hughes; Darryl R. Fahey, both of Bartlesville, Okla.

[73] Assignee: Phillips Petroleum Company, Bartlesville, Okla.

[22] Filed: May 25, 1973

[21] Appl. No.: 364,031

Related U.S. Application Data

[63] Continuation of Ser. No. 213,767, Dec. 29, 1971, abandoned, which is a continuation of Ser. No. 59,019, July 28, 1970, abandoned.

[52] U.S. Cl.......... 204/59 QM; 204/14 N; 252/431; 260/439 R
[51] Int. Cl.............................................. C25b 3/00
[58] Field of Search ............ 204/59 QM; 260/439 R

[56] References Cited
UNITED STATES PATENTS
3,668,086   6/1972   Hughes ............................ 204/59 R FOREIGN PATENTS OR APPLICATIONS
716,072   8/1965   Canada ........................... 260/439 R

OTHER PUBLICATIONS

Fahey, J. Amer. Chem. Soc., 92, pp. 402–404, 1/70.

Miller et al., J. Amer. Chem. Soc., 90, pp. 6248–6250, 10/68.

Primary Examiner—F. C. Edmundson

[57] ABSTRACT

A process for the synthesis of organonickel derivatives by electrochemical reduction of a nickel(II) complex followed by addition of a haloorganic compound which yields a different nickel(II) complex. The complexes have utility as catalysts for olefin dimerization.

10 Claims, No Drawings

ELECTRO-CHEMICAL SYNTHESIS OF ORGANONICKEL COMPOUNDS

This application is a continuation application of application having Ser. No. 213,767, filed Dec. 29, 1971, now abandoned, entitled "Electrochemical Synthesis of Organonickel Compounds," which in turn was a continuation of application Ser. No. 59,019, filed July 28, 1970, now abandoned.

This invention relates to an electrochemical process for the synthesis of organonickel catalyst complexes.

We have found a general method whereby nickel(II) complexes can be electrolyzed under controlled voltage conditions. The resulting product, when contacted with a haloorganic compound, produces an organonickel complex capable of catalyzing the dimerization of olefins in the presence of suitable co-catalysts. The method of our invention consists broadly of subjecting a nickel(II) compound dissolved in a suitable organic solvent to a reducing voltage, followed by addition of a haloorganic compound yielding a different nickel(II) complex, one which contains a nickel-carbon bond.

The method of our invention involves a two-stage process for producing an organonickel complex of the type that possesses activity for olefin dimerization. Experimental conditions appropriate for the first (or electrochemical) stage of our inventive process include the following: A variety of nickel(II) compounds can be used as starting materials, for example, nickel chloride, nickel bromide, nickel nitrate, nickel acetate, and the like. Suitable ligands utilized by the method of our invention include aryl, alkyl, and mixed arylalkylphosphines, for example, triphenylphosphine, triethylphosphine, dimethylphenylphosphine, and chelating ligands such as bis(1,2-diphenylphosphino)ethane.

Additional quantities of the ligands specified above can be added beyond that complexed by the nickel atom in quantities ranging up to and beyond 10 moles of ligand per mole of nickel complex. Organic compounds that are nonreducible and nonreactive under the process conditions of our invention are utilized as solvents and may be selected from, for example, acetonitrile, propionitrile, N,N-dimethylformamide, bis(2-methoxyethyl)ether, sulfolane, 1,2-dimethoxyethane, and dioxane. The preferred applicable solvents are acetonitrile and N,N-dimethylformamide. Tetraalkyl substituted ammonium halides, nitrates, or perchlorates can be employed as electrolytes, for example, tetrabutylammonium perchlorate, and tetrapropylammonium nitrate. The use of an electrolyte is an optional element of our process depending upon the conditions and reagents employed. Reducing voltages range from $-1.7$ to $-3.6$, with about $-2.0$ volts being the preferred reduction voltage. The reduction process continues until the cell current falls to approximately 0 ma indicating that the reduction process is complete. The reduction process requires from about 1 to 8 hours at ambient temperatures with neither the time nor the temperature variable having a critical effect upon the process.

The second stage of our process includes the following appropriate experimental conditions. A wide variety of haloorganic compounds can be employed, for example, pentafluorobromobenzene, hexachlorobenzene, pentachloroiodobenzene, tetrachloroethylene, 2-chlorobenzoylchloride, 1,2,4-trichlorobenzene, tetrabromoethylene, 2-chlorotoluene, chlorotrifluoroethylene, and pentafluoroiodoethane.

The temperature can range broadly within the noncritical limits of from about $-25°$ to $125°C$. The reaction period may extend from 1 minute to 48 hours, with a practical range of from about 10 minutes to about 15 hours. The second stage of our process can operate within both the broad temperature and time ranges without either time or temperature being a critical element. The reaction does not require solvent, however, general organic solvents which are nonreactive with the system involved may be utilized to facilitate quantitative transfer of the electrolytic reduction product from the electrolysis cell. Suitable organic solvents for this use, for example, are benzene, diethylether, acetonitrile, N,N-dimethylformamide, cyclohexane, and dioxane. Standard isolation techniques can be employed to separate the product from the product mixture, for example, solvent evaporation, recrystallization, or elution from a column of active alumina.

The following examples are for illustrative purposes only and are not meant to be limiting upon the scope of our invention.

EXAMPLE I

The apparatus consisted of a U-shaped glass cell with the two side compartments separated by a fritted glass disk. In the working electrode compartment was placed a solution of 1.30 g. dichlorobis(triphenylphosphine)nickel(II) in $10^{-1}$ M tetrabutylammonium perchlorate in 1,2-dimethoxyethane. In the counter electrode compartment was placed a solution of $10^{-1}$ M tetrabutylammonium perchlorate in 1,2-dimethoxyethane.

The nickel-containing solution was subjected to controlled-potential electrolysis at $-3.6$ volts (versus a Ag/AgClO$_4$ reference electrode) for 4¾ hours. The solution then was added, under nitrogen, to 2.20 g. bromopentafluorobenzene. The mixture was heated to $60°C$ for ca. 10 min., then filtered through acid-washed alumina. Concentration of the filtrate on a rotary evaporator left a green oil. Extraction with 40 ml. each of pentane and ether left a green gum. Treatment of the green gum with 30 ml. methanol gave 0.19 g. of a yellow solid which was shown by its infrared spectrum and decomposition point to be bromo(pentafluorophenyl)bis(triphenylphosphine)nickel(II).

EXAMPLE II

Employing the equipment described in Example I, a solution of 0.3 g. dichlorobis(triethylphosphine)nickel(II) and 0.86 g. tetrabutylammonium perchlorate in 25 ml acetonitrile was reduced at $-2.0$ volts (versus a Ag/AgClO$_4$ reference electrode) for 52 min. The solution color changed from dark red to brownish gold. Under nitrogen, 1.82 g. tetrachloroethylene was added to the electrolytic reduction product.

After standing overnight, the solution was chromatographed on a column of acid-washed alumina. Elution with ether:pentane, followed by concentration of the eluate on a rotary evaporator, and by recrystallization from methanol:water afforded 0.033 g. (9 percent of theory) of chloro(trichlorovinyl)bis(triethylphosphine)nickel(II), m.p. $89°-91°C$.

EXAMPLE III

A solution of 0.4 g dichlorobis(triethylphosphine)nickel(II) in 25 ml. acetonitrile was reduced at $-2.0$ volts (versus Ag/AgClO$_4$[0.001 M in acetonitrile]) over a 46-minute period. The maximum current was limited to 100 ma. The product solution was added to a solution of 0.24 g. 2-chlorobenzoyl chloride in 3 ml. acetonitrile. The combined solution was allowed to stand at 25°C for 1 hour, after which it was concentrated at reduced pressure. This concentrate was dissolved in 10 ml. benzene and diluted with 20 ml. pentane which caused a red-brown oil to separate. The supernatant solution was transferred to a column of acid-washed alumina. Elution therefrom with 30 percent ether in pentane under nitrogen pressure afforded 210 mg. (43.2 percent) of chloro(2-chlorophenyl)bis(triethylphosphine)nickel(II), m.p. 89°-90°C.

Equations representative of the three examples discussed above are as follows:

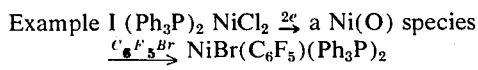

Example I (Ph$_3$P)$_2$ NiCl$_2$ $\xrightarrow{2e}$ a Ni(O) species $\xrightarrow{C_6F_5Br}$ NiBr(C$_6$F$_5$)(Ph$_3$P)$_2$

Example II (Et$_3$P)$_2$NiCl$_2$ $\xrightarrow{2e}$ a Ni(O) species $\xrightarrow{C_2Cl_4}$ NiCl(CClCCl$_2$)(Et$_3$P)$_2$

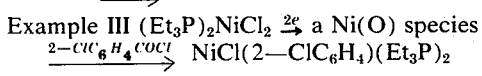

Example III (Et$_3$P)$_2$NiCl$_2$ $\xrightarrow{2e}$ a Ni(O) species $\xrightarrow{2-ClC_6H_4COCl}$ NiCl(2—ClC$_6$H$_4$)(Et$_3$P)$_2$ All three of the reactions as represented above involve the conversion of a complex nickel(II) salt to a nickel(O) species followed by conversion to a nickel-(II) compound involving formation of one nickel-carbon bond. The third example is not as simple as the first two in that the organohalide does not simply add to the nickel(O) species, but in addition the organohalide undergoes decarbonylation with the result that the product contains a 2-chlorophenyl group. The final products of each of these three examples are the type that possess utility as olefin dimerization catalysts in the presence of suitable co-catalysts.

Although the present invention has been described in conjunction with preferred embodiments, it is to be understood that modifications and variations may be resorted to without departing from the spirit and scope of the invention.

We claim:

1. A two-stage process for the synthesis of organonickel catalyst complexes comprising:
    subjecting a nickel(II)-phosphine ligand complex to a reducing voltage of from −1.7 to −3.6 volts in the presence of an electrolyte consisting of at least one of a tetraalkyl substituted ammonium halide, nitrate and perchlorate;
    contacting the reduced nickel(II)-phosphine ligand complex carried in an organic solvent selected from at least one of acetonitrile, propionitrile, N,N-dimethylformamide, bis(2-methoxyethyl)ether, sulfolane, 1,2-dimethoxyethane, and dioxane with a haloorganic compound selected from the group consisting of pentafluorobromobenzene, hexachlorobenzene, pentachloroiodobenzene, tetrabromomethylene, 2-chlorotoluene, chlorotrifluoroethylene, and pentafluoroiodoethane; and
    separating the resulting organonickel catalyst complex.

2. A process according to claim 1 wherein the nickel(II) is selected from at least one of nickel chloride, nickel bromide, nickel nitrate, and nickel acetate; and the ligand is selected from at least one triphenylphosphine, triethylphosphine, dimethylphenylphosphine, and bis(1,2-diphenylphosphino)ethane.

3. A process according to claim 1 for producing bromo(pentafluorophenyl)bis(triphenylphosphine)nickel(II) wherein the nickel(II) compound is nickel chloride, the ligand is triphenylphosphine, and the haloorganic compound is pentafluorobromobenzene.

4. A process according to claim 1 for producing chloro(trichlorovinyl)bis(triethylphosphine)nickel(II) wherein the nickel(II) compound is nickel chloride, the ligand is triethylphosphine, and the haloorganic compound is tetrachloroethylene.

5. A process according to claim 1 for producing chloro(2-chlorophenyl)bis(triethylphosphine)nickel(II) wherein the nickel(II) compound is nickel chloride, the ligand is triethylphosphine, and the haloorganic compound is 2-chlorobenzoylchloride.

6. A process for the synthesis of organonickel catalyst complexes comprising:
    reacting a nickel(II) compound selected from at least one of nickel chloride, nickel bromide, nickel nitrate, and nickel acetate with a nickel(O) stabilizing organophosphine ligand selected from aryl, alkyl, and mixed arylalkyl phosphines;
    subjecting the nickel (II)-phosphines ligand complex carried by an inert organic solvent selected from at least one of acetonitrile, propionitrile, N,N-dimethylformamide, bis(2-methoxyethyl)ether, sulfolane, 1,2-dimethoxyethane, and dioxane to a reducing voltage in order to electrochemically reduce said nickel(II)-phosphine ligand complex to the corresponding nickel(O) complex;
    contacting the nickel(O) complex with a haloorganic compound selected from the group consisting of pentafluorobromobenzene, hexachlorobenzene, pentachloroiodobenzene, tetrachloroethylene, 2-chlorobenzoylchloride, 1,2,4-trichlorobenzene, tetrabromoethylene, 2-chlorotoluene, chlorotrifluoroethylene, and pentafluoroiodoethane to form a nickel(II) haloorganic catalyst conplex containing a nickel-carbon bond; and
    recovering said nickel(II) haloorganic catalyst complex.

7. A process according to claim 6 wherein
    a. the nickel(II)-phosphine ligand complex is electrochemically reduced in the presence of an electrolyte consisting of at least one of a tetraalkyl-substituted ammonium halide, nitrate, and perchlorate, and
    b. the phosphine ligand is selected from at least one of triphenylphosphine, triethylphosphine, dimethylphenylphosphine, and bis(1,2-diphenylphosphino)ethane.

8. A process according to claim 6 for producing bromo(pentafluorophenyl)bis(triphenylphosphine)nickel(II) wherein the nickel(II) compound is nickel chloride, the ligand is triphenylphosphine, and the haloorganic compound is pentafluorobromobenzene.

9. A process according to claim 6 for producing chloro(trichlorovinyl)bis(triethylphosphine)nickel(II) wherein the nickel(II) compound is nickel chloride, the ligand is triethylphosphine, and the haloorganic compound is tetrachloroethylene.

10. A process according to claim 6 for producing chloro(2-chlorophenyl)bis(triethylphosphine)nickel (II) wherein the nickel(II) compound is nickel chloride, the ligand is triethylphosphine, and the haloorganic compound is 2-chlorobenzoylchloride.

* * * * *